(12) United States Patent
Yu

(10) Patent No.: US 6,454,277 B1
(45) Date of Patent: Sep. 24, 2002

(54) FASTENING CHUCK DEVICE FOR MACHINE TOOL

(76) Inventor: Ben Yu, No. 12, Lane 204, Jih San Road, Hsi Tun Chu, Taichung (TW), 407

(*) Notice: Subject to any disclaimer, the term of this patent is extended or adjusted under 35 U.S.C. 154(b) by 94 days.

(21) Appl. No.: 09/685,524

(22) Filed: Oct. 10, 2000

(30) Foreign Application Priority Data

Oct. 13, 1999 (TW) .......................................... 88217588

(51) Int. Cl.⁷ .............................................. B23B 31/20
(52) U.S. Cl. .............................. 279/49; 379/54; 379/91
(58) Field of Search ............................. 279/49, 52, 54, 279/56, 90, 91

(56) References Cited

U.S. PATENT DOCUMENTS

| | | | | |
|---|---|---|---|---|
| 1,808,944 A | * | 6/1931 | Brown | 279/91 |
| 2,449,887 A | * | 9/1948 | Edel et al. | 279/49 |
| 3,332,693 A | * | 7/1967 | Armstrong et al. | 279/91 |
| 3,365,204 A | * | 1/1968 | Benjamin et al. | 279/51 |
| 3,385,606 A | * | 5/1968 | Benjamin et al. | 279/49 |
| 5,522,605 A | * | 6/1996 | Lewis et al. | 279/49 |

FOREIGN PATENT DOCUMENTS

CH 309993 * 12/1955 ................... 279/56

* cited by examiner

*Primary Examiner*—Steven C. Bishop
(74) *Attorney, Agent, or Firm*—Charles E. Baxley

(57) ABSTRACT

A fastening device for fastening a tool member to a machine tool includes a mouth having an inclined inner peripheral surface, a chuck member received in the mouth and having one or more spring blades and having an inclined outer peripheral surface for engaging with the inclined inner peripheral surface of the mouth, and a shaft received in the chuck member. The spring blades may be forced radially inward to clamp the shaft in the chuck member when the mating inclined peripheral surfaces of the chuck member and of the mouth are moved relative to each other.

8 Claims, 4 Drawing Sheets

FASTENING CHUCK DEVICE FOR MACHINE TOOL

BACKGROUND OF THE INVENTION

1. Field of the Invention

The present invention relates to a fastening device, and more particularly to a fastening chuck device for fastening the cutting tools of the machine tools.

2. Description of the Prior Art

Typical fastening chuck devices are provided for fastening the working or the cutting tools to the machine tools, such as the milling machines, the lathes, the drilling machines etc. The machine tool includes a fastener nut threaded to a coupler of the machine tool, and a chuck member engaged between the coupler and the cutting tool. The chuck member may be radially clamped by the fastener nut and may be forced toward the cutting tool to solidly clamp the cutting tool to the coupler. The fastener nut has to be tightly threaded relative to the machine tool for solidly locking the cutting tool to the machine tool and for preventing the cutting tool from being disengaged from the machine tool. The chuck member may not be moved relative to the coupler and may only be clamped to retain the cutting tool in the coupler of the machine tool. After use, it will be difficult to unthread the fastener nut relative to the machine tool to disengage the cutting tool from the machine tool.

The present invention has arisen to mitigate and/or obviate the afore-described disadvantages of the conventional fastening chuck devices for machine tools.

SUMMARY OF THE INVENTION

The primary objective of the present invention is to provide a fastening chuck device including a fastening ferrule coupled to a chuck member to force the chuck member to move longitudinally relative to the machine tool and to fasten the cutting tool to the machine tool.

In accordance with one aspect of the invention, there is provided a fastening device for fastening a tool member to a machine tool, the fastening device comprising a body including a mouth having an inclined inner peripheral surface formed therein, a chuck member received in the mouth of the body and including at least one spring blade provided therein, and including an inclined outer peripheral surface formed thereon for engaging with the inclined inner peripheral surface of the mouth and for forcing the at least one spring blade of the chuck member radially inwardly when the inclined outer peripheral surface of the chuck member is moved relative to the inclined inner peripheral surface of the mouth of the body, a shaft received in the chuck member and engaged with the at least one spring blade of the chuck member, and means for moving the chuck member inwardly of the mouth of the body to force the at least one spring blade of the chuck member to engage with the shaft and to secure the shaft in the chuck member. The chuck member is moved longitudinally inward of the mouth of the body and is not required to be rotated relative to the mouth of the body, such that the chuck member may be solidly secured to the shaft by the moving means.

The moving means includes a fastening ferrule, and means for rotatably securing the chuck member in the fastening ferrule. The rotatably securing means includes a clamping ring secured between the chuck member and the fastening ferrule for rotatably securing the chuck member in the fastening ferrule.

The chuck member and the fastening ferrule each includes a peripheral channel formed therein for rotatably receiving the clamping ring and for retaining the clamping ring between the chuck member and the fastening ferrule.

The moving means further includes a barrel received in the fastening ferrule and having an inner thread formed therein for threading with the mouth of the body. The barrel includes a peripheral flange extended radially inward therefrom and engaged with the chuck member.

A securing device is further provided for securing the barrel in the fastening ferrule and includes a rod engaged with the barrel and the fastening ferrule to secure the barrel in the fastening ferrule. The barrel and the fastening ferrule each includes a longitudinal slot formed therein for receiving the rod.

A bolt is threaded with the barrel and the fastening ferrule to secure the barrel in the fastening ferrule. The barrel and the fastening ferrule each includes a threaded depression formed therein for threading with the bolt.

The fastening ferrule includes an inclined inner peripheral surface formed therein, the chuck member includes an inclined outer peripheral surface formed thereon and engaged with the inclined inner peripheral surface of the fastening ferrule for allowing the fastening ferrule to move the chuck member inwardly of the mouth of the body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
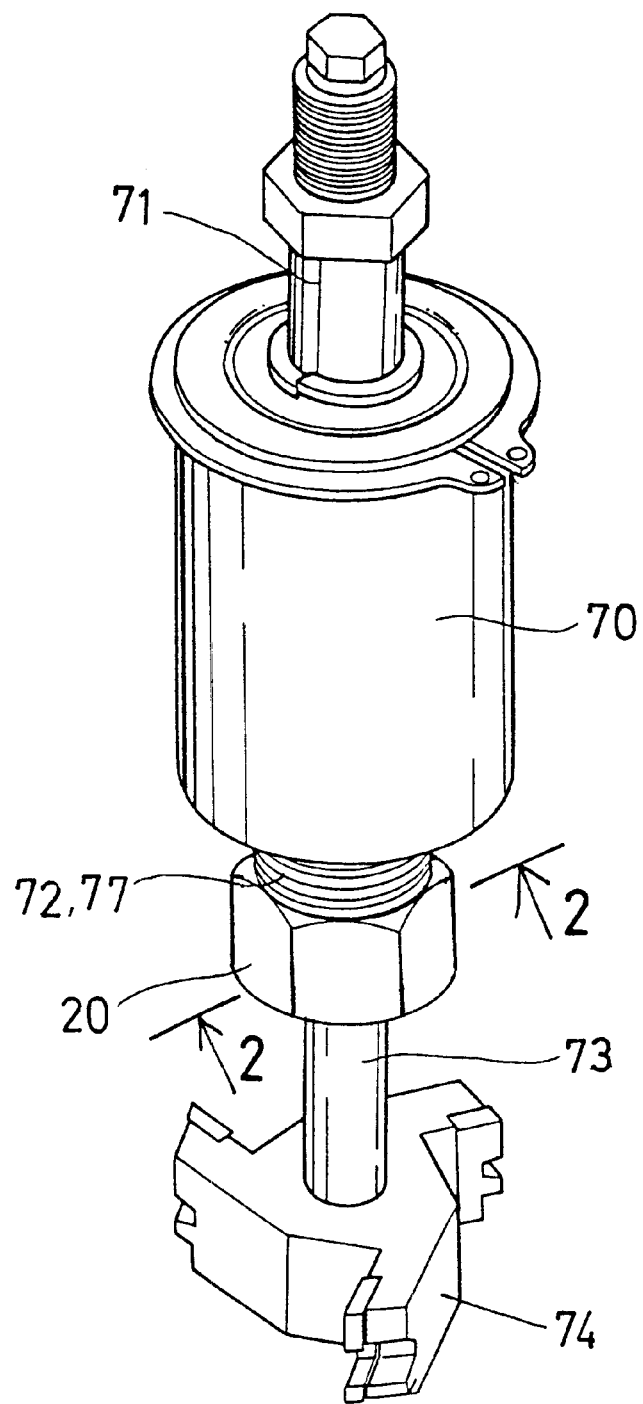
FIG. 1 is a partial perspective view showing the attachment of a fastening chuck device to a machine tool in accordance with the present invention.
Figure 2:
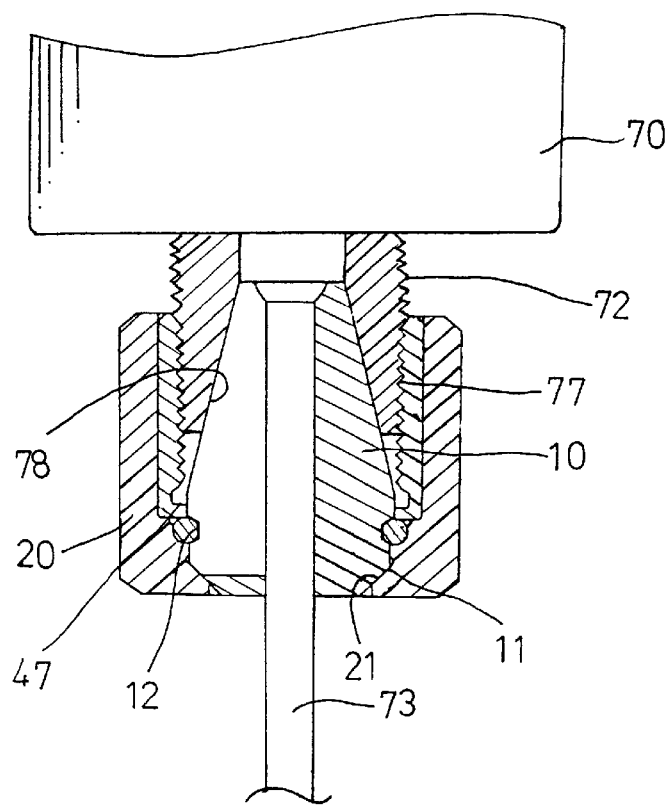
FIG. 2 is a partial cross sectional view taken along lines 2—2 of FIG. 1.
Figure 5:
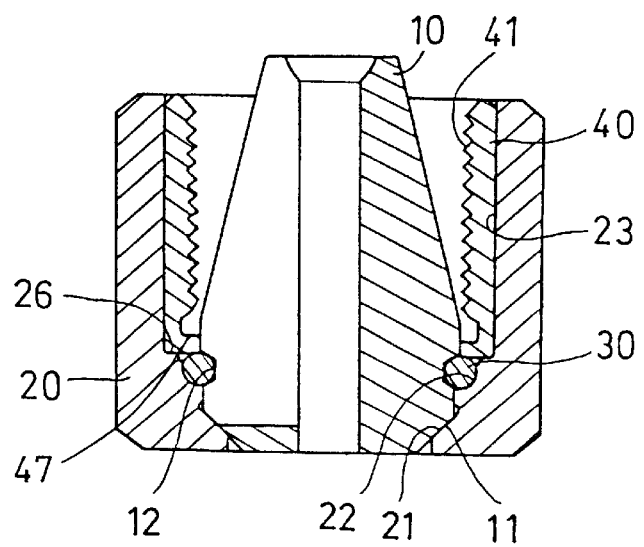
FIG. 5 is a cross sectional view taken along lines 5—5 of FIG. 4.
Figure 3:
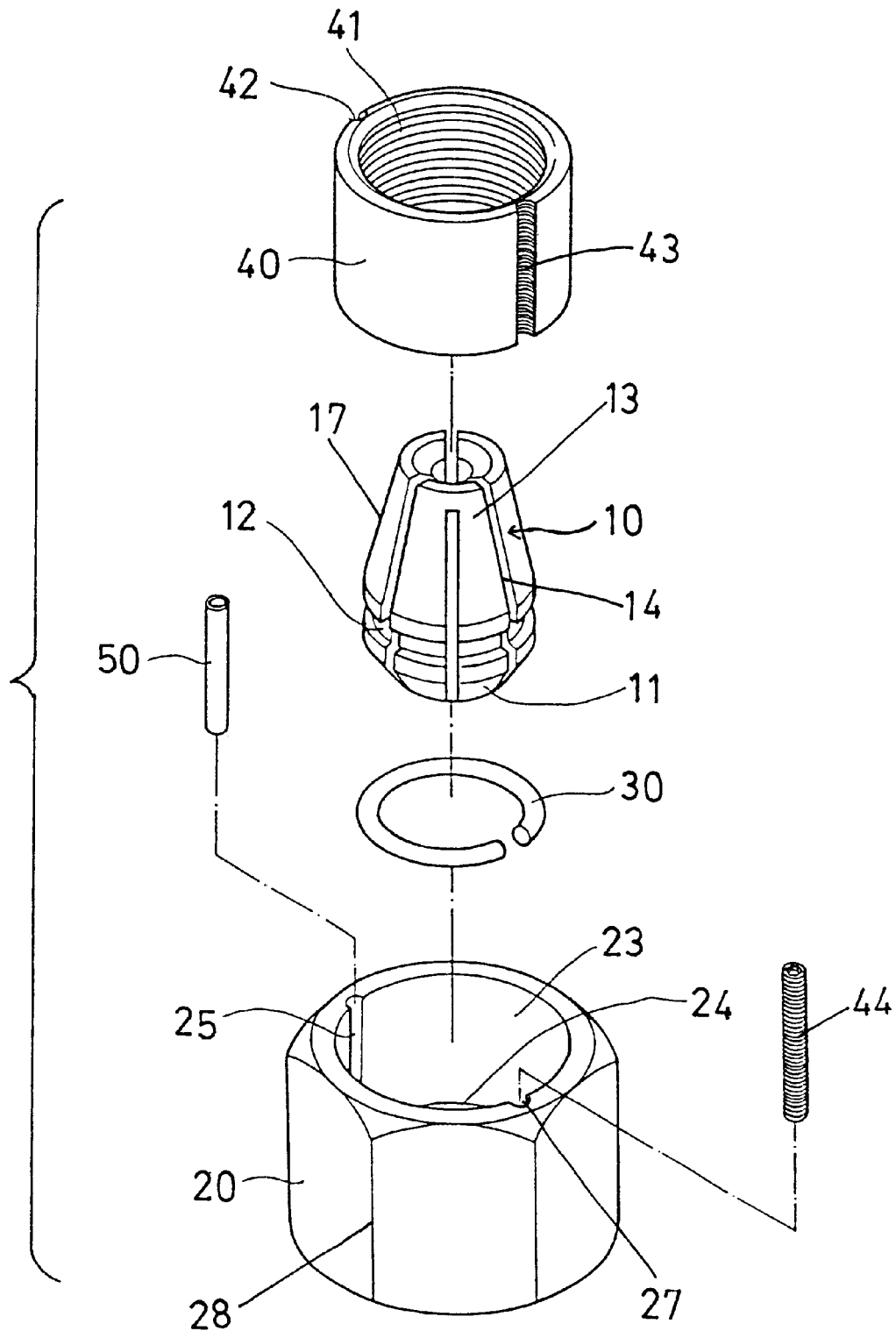
FIG. 3 is an exploded view of the fastening chuck device.
Figure 4:
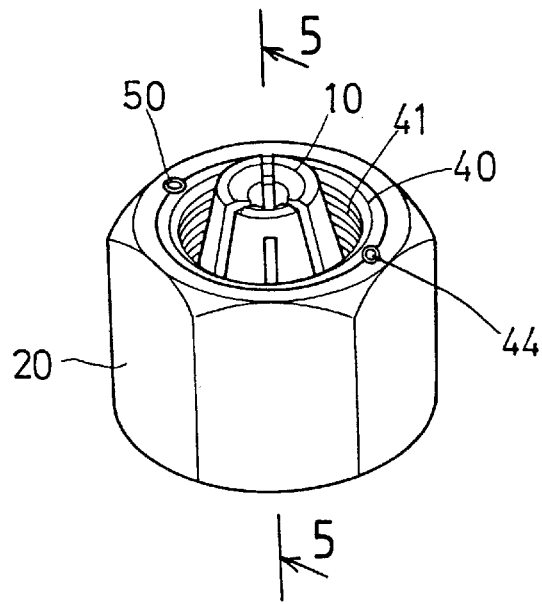
FIG. 4 is a perspective view of the fastening chuck device.
Figure 6:
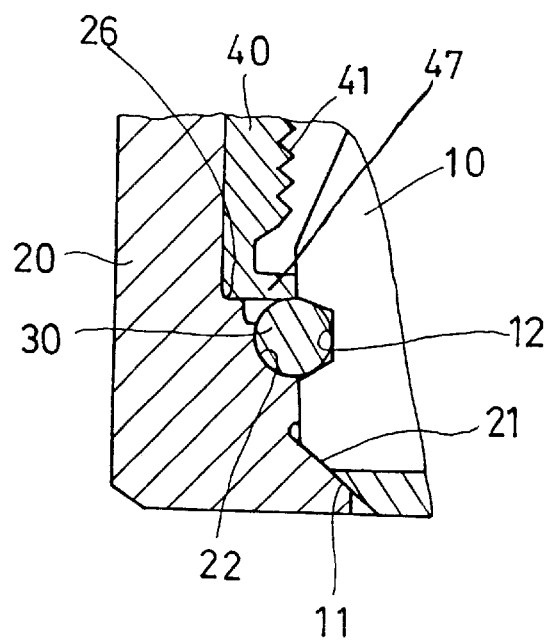
FIG. 6 is an enlarged partial cross sectional view of the fastening chuck device.

Referring to the drawings, and initially to FIGS. 1 and 2, a machine tool in accordance with the present invention comprises a machine tool body or a chuck body or simply a housing body 70 including a spindle 71 rotatably provided therein for coupling to and for being driven by a driving mechanism. The body 70 includes a mouth 72 extended downward therefrom for receiving a shaft 73 therein which is used for supporting a cutting tool 74, or a drilling tool, or the like. The machine tool includes a fastening chuck device or a fastening device having a fastening ferrule 20 for securing the shaft 73 to the mouth 72 of the body 70. The mouth 72 includes a conical or inclined inner peripheral surface 78 formed therein for receiving a chuck member 10 of the fastening device.

Referring next to FIGS. 3–6, and again to FIG. 2, the chuck member 10 of the fastening device includes one or more slits 14, particularly the longitudinal slits 14 formed therein for defining or forming one or more spring blades 13, particularly the longitudinal spring blades 13, therein and for clamping the shaft 73 in the chuck member 10. The chuck member 10 includes a peripheral channel 12 formed therein for receiving a retaining ring 30 therein, and includes an upper portion and/or a middle portion having an inclined outer peripheral surface 17 formed thereon for engaging with the corresponding or mating inclined inner peripheral surface 78 of the mouth 72, and for forcing the spring blades 13 radially inward or toward each other and to solidly clamp the shaft 73 in the chuck member 10 when the chuck member 10 is forced to move toward the body 70 and to move longitudinally relative to the mouth 72 of the body 70. The chuck member 10 includes a lower portion having another inclined outer peripheral surface 11 formed thereon opposite to the inclined outer peripheral surface 17 of the chuck member 10.

The fastening ferrule 20 of the fastening device includes a lower portion having an inner inclined peripheral surface 21 formed therein for engaging with the inclined outer peripheral surface 11 of the chuck member 10 and for rotatably retaining the chuck member 10 within the fastening ferrule 20 and for forcing the chuck member 10 to move longitudinally relative to the mouth 72 of the body 70 when the fastening ferrule 20 is moved longitudinally relative to the mouth 72 of the body 70. The fastening ferrule 20 includes an inner peripheral channel 22 formed therein for receiving or for seating the retaining ring 30, and includes a peripheral shoulder 26 formed therein. The fastening ferrule 20 includes a longitudinal slot 25 formed therein, and includes a longitudinal threaded depression 27 formed therein, opposite to the longitudinal slot 25 of the fastening ferrule 20, for receiving a rod 50 and a bolt 44 respectively. The fastening ferrule 20 includes an engaging surface 28, such as a hexagonal engaging surface 28 formed on the outer peripheral portion for engaging with and for being rotated and driven relative to the mouth 72 of the body 70 by a driving tool, such as a wrench.

A barrel 40 is rotatably received in the fastening ferrule 20 and is engaged with the peripheral shoulder 26 of the fastening ferrule 20 and includes an inner thread 41 formed therein for threading with the outer thread 77 of the mouth 72 of the body 70 and includes an outer peripheral portion having a longitudinal slot 42 formed therein, and having a longitudinal threaded depression 43 formed therein, opposite to the longitudinal slot 42 of the barrel 40. The longitudinal slot 25 of the fastening ferrule 20 and the longitudinal slot 42 of the barrel 40 form a hole for receiving the rod 50, such that the barrel 40 may be secured to the fastening ferrule 20 and may be rotated in concert with the fastening ferrule 20. The longitudinal threaded depression 27 of the fastening ferrule 20 and the longitudinal threaded depression 43 of the barrel 40 form a threaded hole for threading with the bolt 44 which may solidly secure the barrel 40 to the fastening ferrule 20. The barrel 40 includes a peripheral flange 47 extended radially inward from the bottom portion thereof for engaging with the retaining ring 30 and for engaging with the chuck member 10 and for rotatably securing the check member 10 within the barrel 40 and the fastening ferrule 20.

In operation, as shown in FIG. 2, when the fastening ferrule 20 is rotated or driven relative to the mouth 72 of the body 70 by the driving tool, such as the wrench, the barrel 40 may be rotated relative to the mouth 72 of the body 70 by the fastening ferrule 20, and the chuck member 10 may be forced to move inwardly of or to move longitudinally relative to the mouth 72 of the body 70, such that the spring blades 13 of the chuck member 10 may be forced toward each other to solidly clamp the shaft 73 in the chuck member 10 by the mating inclined outer peripheral surface 17 of the chuck member 10 and the inclined inner peripheral surface 78 of the mouth 72. The chuck member 10 is not required to be rotated relative to the mouth 72 of the body 70 and is only required to be moved inward of or to move longitudinally relative to the mouth 72 of the body 70.

Accordingly, the fastening chuck device for the machine tool in accordance with the present invention includes a fastening ferrule coupled to a chuck member to force the chuck member to move longitudinally relative to the machine tool and to fasten the cutting tool to the machine tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A fastening device for fastening a tool member to a machine tool, said fastening device comprising:

a body including a mouth having an inclined inner peripheral surface formed therein, a chuck member received in said mouth of said body and including at least one spring blade provided therein, and including an inclined outer peripheral surface formed thereon for engaging with said inclined inner peripheral surface of said mouth and for forcing said at least one spring blade of said chuck member radially inwardly when said inclined outer peripheral surface of said chuck member is moved relative to said inclined inner peripheral surface of said mouth of said body, a shaft received in said chuck member and engaged with said at least one spring blade of said chuck member, means for moving said chuck member inwardly of said mouth of said body to force said at least one spring blade of said chuck member to engage with said shaft and to secure said shaft in said chuck member, said moving means including a fastening ferrule, means for rotatably securing said chuck member in said fastening ferrule, a barrel received in said fastening ferrule and having an inner thread formed therein for threading with said mouth of said body, and means for securing said barrel in said fastening ferrule, said securing means including a rod engaged with said barrel and said fastening ferrule to secure said barrel in said fastening ferrule.

2. The fastening device according to claim 1, wherein said rotatable securing means includes a clamping rind secured between said chuck member and said fastening ferrule for rotatable securing said chuck member in said fastening ferrule.

3. The fastening device according to claim 2, wherein said chuck member and said fastening ferrule each includes a peripheral channel formed therein for rotatably receiving said clamping ring and for retaining said clamping ring between said chuck member and said fastening ferrule.

4. The fastening device according to claim 1, wherein said barrel includes a peripheral flange extended radially inward therefrom and engaged with said chuck member.

5. The fastening device according to claim 1, wherein said barrel and said fastening ferrule each includes a longitudinal slot formed therein for receiving said rod.

6. A fastening device for fastening a tool member to a machine tool, said fastening device comprising:

a body including a mouth having an inclined inner peripheral surface formed therein, a chuck member received in said mouth of said body and including at least one spring blade provided therein, and including an inclined outer peripheral surface formed thereon for engaging with said inclined inner peripheral surface of said mouth and for forcing said at least one spring blade of said chuck member radially inwardly when said inclined outer peripheral surface of said chuck member is moved relative to said inclined inner peripheral surface of said mouth of said body, a shaft received in said chuck member and engaged with said at least one spring blade of said chuck member, means for moving said chuck member inwardly of said mouth of said body to force said at least one spring blade of said chuck member to engage with said shaft and to secure said shaft in said chuck member, said moving means including a fastening ferrule, and means for rotatably securing said chuck member in said fastening ferrule, and a barrel received in said fastening ferrule and having an inner thread formed therein for threading with said mouth of said body, and means for securing said barrel in said fastening ferrule, said securing means including a bolt threaded with said barrel and said fastening ferrule to secure said barrel in said fastening ferrule.

7. The fastening device according to claim 6, wherein said barrel and said fastening ferrule each includes a threaded depression formed therein for threading with said bolt.

8. The fastening device according to claim 6, wherein said fastening ferrule includes an inclined inner peripheral surface formed therein, said chuck member includes a second inclined outer peripheral surface formed thereon and engaged with said inclined inner peripheral surface of said fastening ferrule for allowing said fastening ferrule to move said chuck member inwardly of said mouth of said body.

* * * * *